(12) United States Patent
Yang et al.

(10) Patent No.: US 10,958,093 B2
(45) Date of Patent: *Mar. 23, 2021

(54) POWER MANAGEMENT SYSTEM AND METHOD FOR OPERATING THE SAME

(71) Applicant: Advanced Semiconductor Engineering, Inc., Kaohsiung (TW)

(72) Inventors: Tau-Jing Yang, Kaohsiung (TW); Kuo-Feng Huang, Kaohsiung (TW); Chih Lung Hung, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,078

(22) Filed: Mar. 18, 2020

(65) Prior Publication Data
US 2020/0220372 A1 Jul. 9, 2020

Related U.S. Application Data

(63) Continuation of application No. 15/585,076, filed on May 2, 2017, now Pat. No. 10,622,836.

(51) Int. Cl.
*H02J 7/00* (2006.01)
*H02J 50/10* (2016.01)

(52) U.S. Cl.
CPC ...... *H02J 7/0091* (2013.01); *H02J 7/007188* (2020.01); *H02J 7/007192* (2020.01);
(Continued)

(58) Field of Classification Search
CPC ....................................................... H02J 7/025
(Continued)

(56) References Cited

U.S. PATENT DOCUMENTS

| | | | |
|---|---|---|---|
| 9,166,434 B2 | 10/2015 | Huang et al. | |
| 2007/0182380 A1* | 8/2007 | DiGiovanna | H02J 7/0091 320/150 |

(Continued)

FOREIGN PATENT DOCUMENTS

| | | |
|---|---|---|
| CN | 102593883 A | 7/2012 |
| CN | 103311898 A | 9/2013 |

OTHER PUBLICATIONS

Final Office Action for U.S. Appl. No. 15/585,076, dated Aug. 7, 2019, 18 pages.

(Continued)

*Primary Examiner* — Edward Tso
*Assistant Examiner* — Ahmed H Omar
(74) *Attorney, Agent, or Firm* — Foley & Lardner LLP

(57) ABSTRACT

The present disclosure relates to a power management system. The power management system comprises a first power supply device, a second power supply device, a power supply control device, a data processing device and a load. The power supply control device is connected to the first power supply device. The data processing device is connected to the first power supply device, the second power supply device and the power supply control device. The load is connected to the first power supply device and the second power supply device. The power supply control device is configured to, when activated, provide a first signal to the data processing device. The data processing device is configured to select the first power supply device or the second power supply device to provide power to the load according to the first signal.

15 Claims, 4 Drawing Sheets

(52) U.S. Cl.
CPC ........ *H02J 7/007194* (2020.01); *H02J 50/10* (2016.02); *H02J 7/00* (2013.01); *H02J 7/00045* (2020.01); *H02J 7/00302* (2020.01); *H02J 2207/10* (2020.01); *H02J 2207/40* (2020.01)

(58) Field of Classification Search
USPC .................................................. 320/108, 150
See application file for complete search history.

(56) References Cited

U.S. PATENT DOCUMENTS

| | | | |
|---|---|---|---|
| 2009/0160405 A1* | 6/2009 | Takeda ................ | H01M 10/425 320/152 |
| 2012/0161697 A1 | 6/2012 | Park et al. | |
| 2013/0076155 A1* | 3/2013 | Yu .......................... | H02J 50/80 307/104 |
| 2013/0241500 A1 | 9/2013 | Cheng et al. | |
| 2014/0184171 A1 | 7/2014 | Lee et al. | |
| 2014/0225558 A1 | 8/2014 | Park | |
| 2017/0054328 A1 | 2/2017 | Jung et al. | |
| 2019/0145833 A1* | 5/2019 | Ryu .................. | H02J 7/007192 340/870.17 |

OTHER PUBLICATIONS

Non-Final Office Action for U.S. Appl. No. 15/585,076, dated Jan. 25, 2019, 12 pages.
Notice of Allowance for U.S. Appl. No. 15/585,076, dated Dec. 3, 2019, 8 pages.
Office Action for corresponding Chinese Patent Application No. 201810015908.8 dated Jan. 15, 2021, 12 pages.
Search Report for corresponding Chinese Patent Application No. 201810015908.8 dated Jan. 15, 2021, 4 pages (with English translation).

* cited by examiner

POWER MANAGEMENT SYSTEM AND METHOD FOR OPERATING THE SAME

This application is a continuation of U.S. patent application Ser. No. 15/585,076 filed May 2, 2017, the contents of which is incorporated herein by reference in its entirety.

BACKGROUND

1. Technical Field

The present disclosure relates to a system and a method for power management, and more particularly to a system and a method for controlling power for a wireless and a wired charger.

2. Description of the Related Art

It is desirable to integrate a wired charger (e.g., an USB charger) and a wireless charger (e.g., an induction charger) into a single electronic device to charge a battery of the electronic device. However, when a thermal sensitive resistor of the electronic device is connected to both of the wired charger and the wireless charger, a voltage across the thermal sensitive resistor may not precisely reflect temperature changes of the battery of the electronic device. Moreover, for a conventional electronic device, a central processing unit (CPU) of the convention electronic device stays in operation to monitor the remaining power level of the battery, and continues to consume electric power of the electronic device.

SUMMARY

In accordance with some embodiments of the present disclosure, a power management system comprises a first power supply device, a second power supply device, a power supply control device, a data processing device and a load. The power supply control device is connected to the first power supply device. The data processing device is connected to the first power supply device, the second power supply device and the power supply control device. The load is connected to the first power supply device and the second power supply device. The power supply control device is configured to, when activated, provide a first signal to the data processing device. The data processing device is configured to select the first power supply device or the second power supply device to provide power to the load according to the first signal.

In accordance with some embodiments of the present disclosure, a power management system comprises a battery, multiple power supply devices, a power supply control device, a microcontroller unit (MCU) and multiple transistors (e.g., Metal-Oxide-Semiconductor Field-Effect Transistors (MOSFETs)). The battery includes thermal sensitive sensor that is configured to provide a first signal based on a temperature change of the battery. Each of multiple power supply devices is connected to the battery. The power supply control device is connected with the multiple power supply devices to provide a selection signal. The MCU is connected with the battery and the power supply control device. The MCU is configured to receive the first signal and the selection signal and to generate a control signal based on the received first signal and the selection signal. Each transistor connects the power supply devices to the MCU and is configured to enable or disable the corresponding power supply device to provide power to the battery according to the control signal.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Figure 1A:
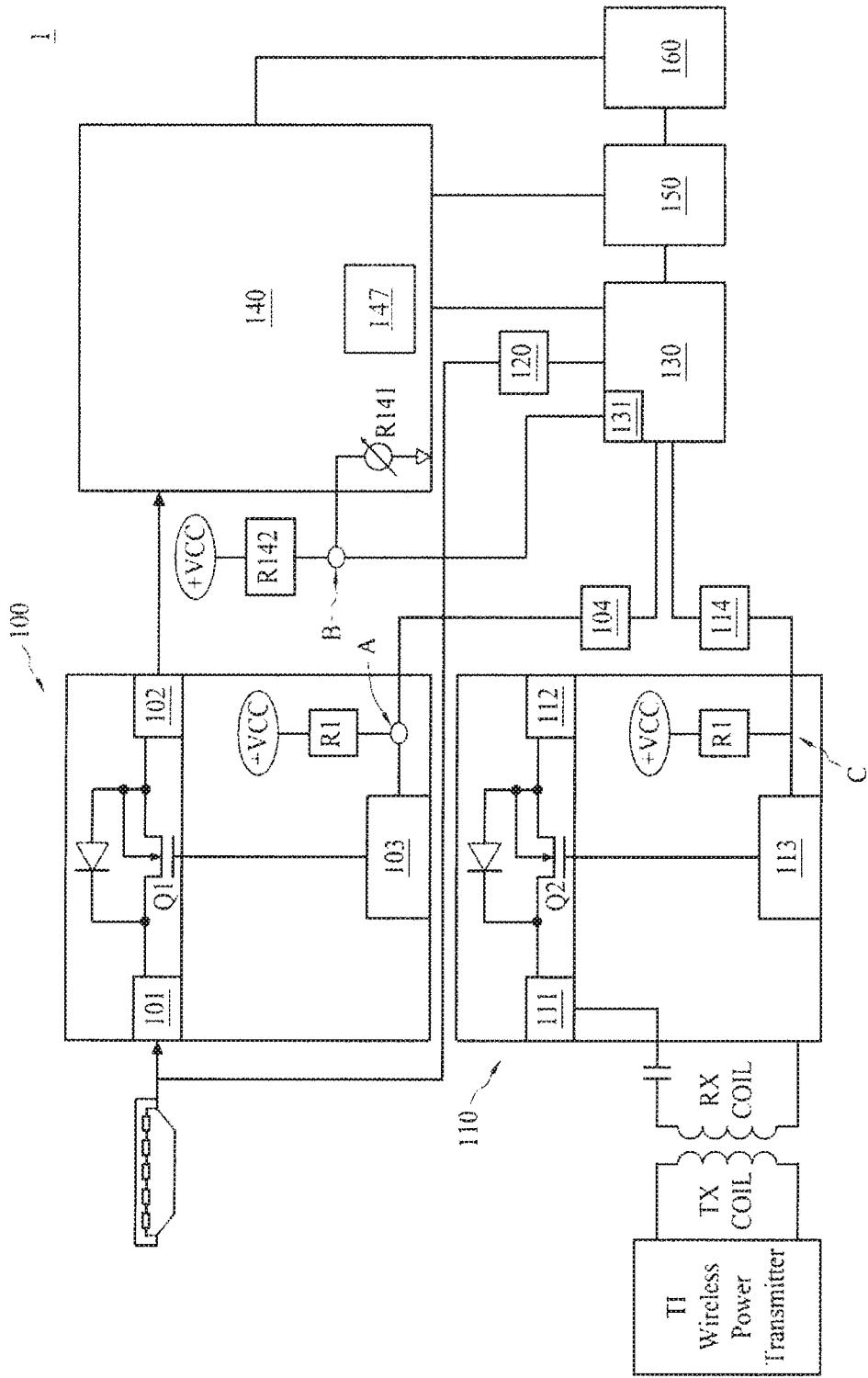
FIG. 1A illustrates a block diagram of a power management system in accordance with some embodiments of the present disclosure.

Common reference numerals are used throughout the drawings and the detailed description to indicate the same or similar components. The present disclosure will be more apparent from the following detailed description taken in conjunction with the accompanying drawings.

DETAILED DESCRIPTION

Various embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings. are disclosed below using specific language. It will nevertheless be understood that the embodiments and examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

According to at least some embodiments of the present disclosure, a power management system is disclosed herein. The power management system includes a microcontroller unit (MCU) that monitors a temperature of a battery (e.g., through a thermal sensitive resistor) and a remaining power level of the battery. Depending on the temperature, the MCU may send signal(s) to a wired charger or a wireless charger for charging the battery or stopping to charge the battery. If the remaining power level of the battery is low, the MCU may control the battery to stop supplying electric power to other circuits (e.g., CPU). To reduce power consumption, the MCU may continue operating to monitor the battery temperature and the battery power level when other circuits such as the CPU are not operating.

FIG. 1A illustrates a block diagram of a power management system 1 in accordance with some embodiments of the present disclosure. The power management system 1 (also simply referred to as "system") includes a first power supply device 100, a second power supply device 110, a power supply control device 120, a data processing device 130 (e.g., a processor), a load 140, a power management device 150 and a central processing unit (CPU) 160.

The first power supply device 100 may be a wired power supply device. In some embodiments, the first power supply device 100 may be, e.g., a Universal Serial Bus (USB) charger. The first power supply device 100 includes an input port 101, an output port 102, a transistor Q1, a controller 103 and a power supply circuit 104.

The input port 101 is configured to receive a signal or power from one or more external devices. For example, the input port 101 may be a USB port adapted to receive a USB plug of a cable, which is capable of being electrically coupled to the USB port of the first power supply device 100. In other examples, the input port 101 may interface with the cable by a plug that is different from a USB plug.

The transistor Q1 is electrically connected to the input port 101, the output port 102 and the controller 103. The transistor Q1 can be turned on or turned off by the controller 103 according to the signals received from the power supply circuit 104. In some embodiments, the transistor Q1 may be, e.g., an n-type metal-oxide-semiconductor (NMOS), and the gate of the transistor Q1 may be electrically connected to the controller 103.

If the controller 103 sends a high voltage (e.g., about 3V, about 5V, about 12V or other voltages depending on different embodiments of the present disclosure) to the gate of the transistor Q1, the transistor Q1 is turned on and electric power can be transmitted from the input port 101 to the output port 102 to provide the electric power to the load 140. If the controller 103 sends a low voltage (e.g., 0V, about 0.5V, or about 1V, or other voltages depending on different embodiments of the present disclosure) to the gate of the transistor Q1, the transistor Q1 is turned off to stop transmitting the electric power (or electrical signal) from the input port 101 to the output port 102. In some embodiments, the transistor Q1 may be a p-type metal-oxide-semiconductor (PMOS). In some embodiments, if the voltage sent by the controller 103 is higher than a threshold value (e.g., about 1V, about 3V, about 5V, or about 12V), the transistor Q1 is turned on. If the voltage sent by the controller 103 is lower than or equal to the threshold value (e.g., about 1V, about 3V, about 5V, or about 12V), the transistor Q1 is turned off.

Figure 1B:
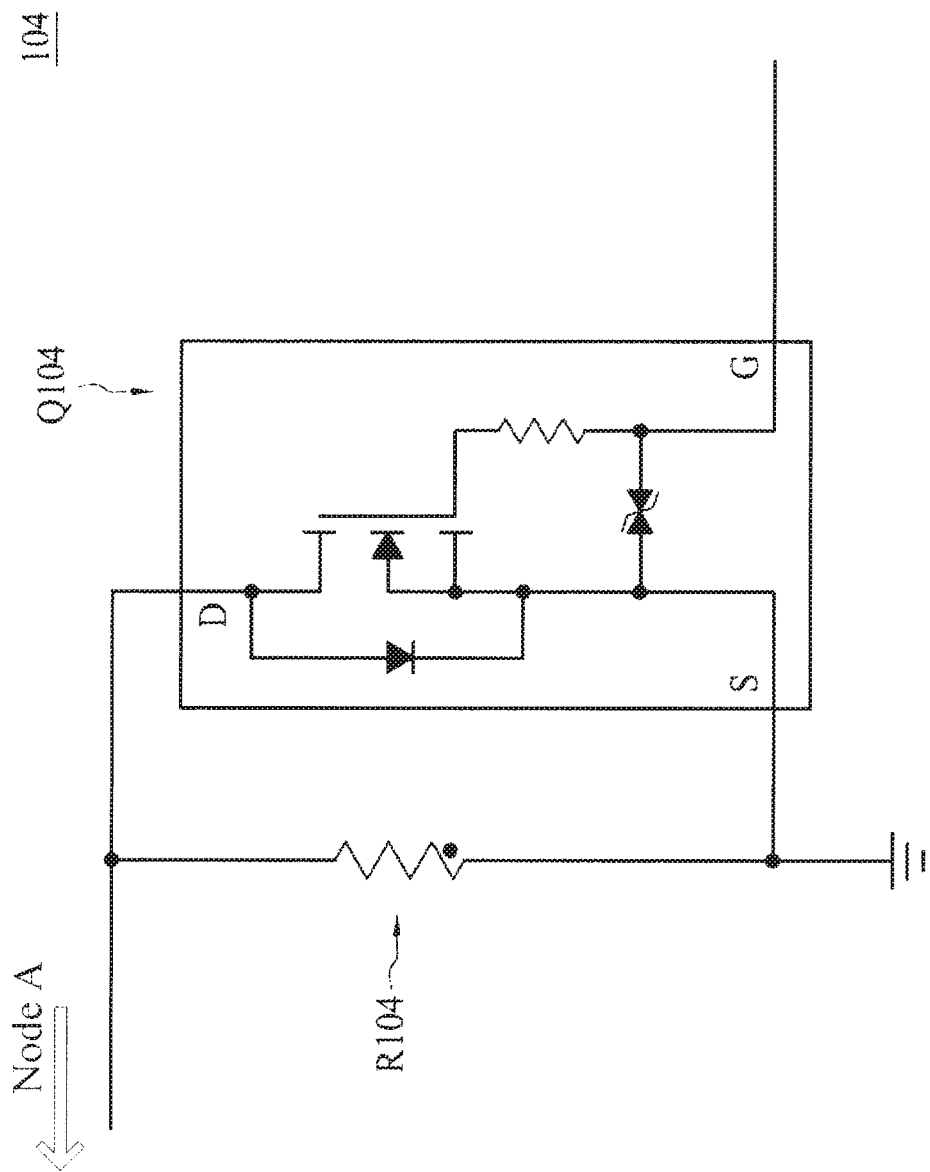
FIG. 1B illustrates a block diagram of a power supply circuit in accordance with some embodiments of the present disclosure.

Referring to FIG. 1B, in accordance with some embodiments of the present disclosure, the power supply circuit 104 may include a transistor Q104 and a resistor R104 that are connected in parallel. A terminal of the resistor R104 and a drain D of the transistor Q104 are electrically connected to the node A (as shown in FIG. 1A). Another terminal of the resistor R104 and the source S of the transistor Q104 are electrically connected to ground. The gate G of the transistor Q104 of the power supply circuit 104 is electrically connected to the data processing device 130 (as shown in FIG. 1A).

If the transistor Q104 of the power supply circuit 104 is turned on by the data processing device 130 (e.g., when a high voltage is applied to the gate G of the transistor Q104), the drain D and the source S of the transistor Q104 of the power supply circuit 104 are short-circuited. Thus, the node A is grounded and the controller 103 does not turn on the transistor Q1. If the transistor Q104 of the power supply circuit 104 is turned off by the data processing device 130 (e.g., when a low voltage is applied to the gate G of the transistor Q104), the drain D and the source S of the transistor Q104 of the power supply circuit 104 are open-circuited. The voltage of the node A is a divided voltage across the resistor R104 of the power supply circuit 104, and the controller 103 turns on the transistor Q1. In some embodiments, the power supply circuit 104 may be integrated into the first power supply device 100.

Referring back to FIG. 1A, the second power supply device 110 may be a wireless power supply device. The second power supply device 110 includes an input port 111, an output port 112, a transistor Q2, a controller 113 and a power supply circuit 114. In some embodiments, the second power supply device 110 may be similar to the first power supply device 100 except that the input port 111 of the second power supply device 110 is a coil assembly rather than a USB port. The coil assembly is configured to receive electromagnetic waves and to convert energy of the electromagnetic waves into electric power (e.g., through induced current). The power supply circuit 114 may be similar to the power supply circuit 104 as shown in FIG. 1B. In some embodiments, the power supply circuit 114 may be integrated into the second power supply device 110.

In some embodiments, the data processing device 130 may be a microcontroller unit (MCU) that contains a processor, random-access memory (RAM), read-only memory (ROM), clock and/or input/output (I/O) control unit. The data processing device 130 may include configurable blocks of analog and/or digital logics as well as programmable interconnects.

The data processing device 130 is connected to the power supply circuit 104 of the first power supply device 100 and the power supply circuit 114 of the second power supply device 110. The processor is further connected to the input port 101 of the first power supply device 110 through the power supply control device 120. In some embodiments, the data processing device 130 is configured to send one or more signals to both of the power supply circuit 104 and the power supply circuit 114 to turn off the transistors of the power supply circuit 104 and the power supply circuit 114. The voltage at node A or node C is a divided voltage across the resistor (e.g., R104) of the power supply circuit 104 or the power supply circuit 114. And the transistor Q1 or Q2 is turned on. Therefore, when the first power supply device 100 is activated (e.g., when the USB port is plugged) or the second power supply device 110 is activated (e.g., when a current is induced at the coil assembly by electromagnetic waves), the transistor Q1 or Q2 can provide electric power to the load.

In some embodiments, if both of the first power supply device 100 and the second power supply device 110 are activated, the data processing device 130 may receive a signal from the power supply control device 120 and in response send another signal to the power supply circuit 114 to turn off the transistor Q2 of the second power supply device 110. Thus, the first power supply device 100, instead of the second power supply device 110, can supply electric power to the load 140. In other words, the priority of the first power supply device 100 is higher than the priority of the second power supply device 110 in the case that both of the power supply devices 100 and 110 are activated. In some embodiments, the power supply control device 120 may serve as a rectification and a DC-DC converter (e.g., about 5V to about 3V, about 12 V to about 5V, about 12V to about 3V, etc.). In some embodiments, the power supply control device 120 can be integrated into the data processing device 130.

The data processing device 130 is connected to the load 140 and configured to detect a temperature within the load 140. In some embodiments, depending on the detected temperature of the load 140, the data processing device 130 may turn on or off the first power supply device 100 and/or the second power supply device 110 to power (or to stop supplying power to) the load 140. In some embodiments, the data processing device 130 may include an analog-to-digital converter (ADC) 131 connected to a thermal sensitive sensor R141 of the load 140. The resistance level of the thermal sensitive sensor R141 may vary depending on the temperature within the load 140. Thus, the voltage of the node B, which is a divided voltage between resistors R142 and R141, may vary depending on the temperature within the load 140 as well. The ADC 131 is configured to receive the voltage at the node B and convert the received voltage into a digital signal for the data processing device 130. If the temperature within the load 140 is higher than a predetermined threshold value (e.g., about 40 degrees, about 45 degrees, about 50 degrees, about 60 degrees, etc.), the data processing device 130 sends one or more signals to the first power supply device 100 and/or the second power supply device 110 to stop the devices 100 and/or 110 from providing electric power to the load 140. In some other embodiments, the data processing device 130 may enable the devices 100 and/or 110 to provide electric power to the load 140 in response to the temperature being lower than or equal to the predetermined threshold value. When the temperature is higher than the predetermined threshold value, the data processing device 130 may disable the devices 100 and/or 110 to provide electric power to the load 140.

In some embodiments, the load 140 may be, e.g., a battery. The data processing device 130 is connected to the load 140 to detect the remaining power level of the load 140 (e.g., through a power level detector 147) and to send a signal indicating the remaining power level to the power management device 150. Depending on the remaining power level, the power management device 150 is configured to allow or disallow the load 140 to power the CPU 160 or other circuits. In some embodiments, if the remaining power of the load 140 is less than a predetermined threshold value (e.g., less than about 30%, less than about 20%, less than about 10%, less than about 5%, or less than about 2%), the data processing device 130 sends a signal to the power management device 150 to stop the load 140 from supplying electric power to the CPU 160 or other circuits. In some embodiments, the power management device 150 can be integrated into the data processing device 130.

In some alternative power management systems including both a wired charger and a wireless charger, a voltage across a thermal sensitive resistor within a battery may not precisely reflect the temperature changes of the battery because the thermal sensitive resistor is connected to both of the wired charger and the wireless charger. In addition, in the alternative power management systems, a central processing unit (CPU) stays in operation to monitor the power level of the battery, and continues consuming electric power of the electronic device.

According to at least the embodiments of FIG. 1A, an MCU (e.g., data processing device 130) rather than a CPU serves to monitor the power of the battery and therefore reduces the power consumption, since a dedicated MCU may have a smaller power consumption level compared to a CPU. In addition, as shown in FIG. 1A, since the thermal sensitive resistor R141 is connected to the data processing device 130 instead of directly being connected to the wired charger and the wireless charger, the signal of temperature changes of the load 140 detected by the data processing device 130 precisely reflects the current temperature within the load 140. In some embodiments, the power management system 1 may used for, but not limited to, a vehicle remote controller, a mobile phone, a tablet, a computer or other electronic devices equipped with a battery.

Figure 2:
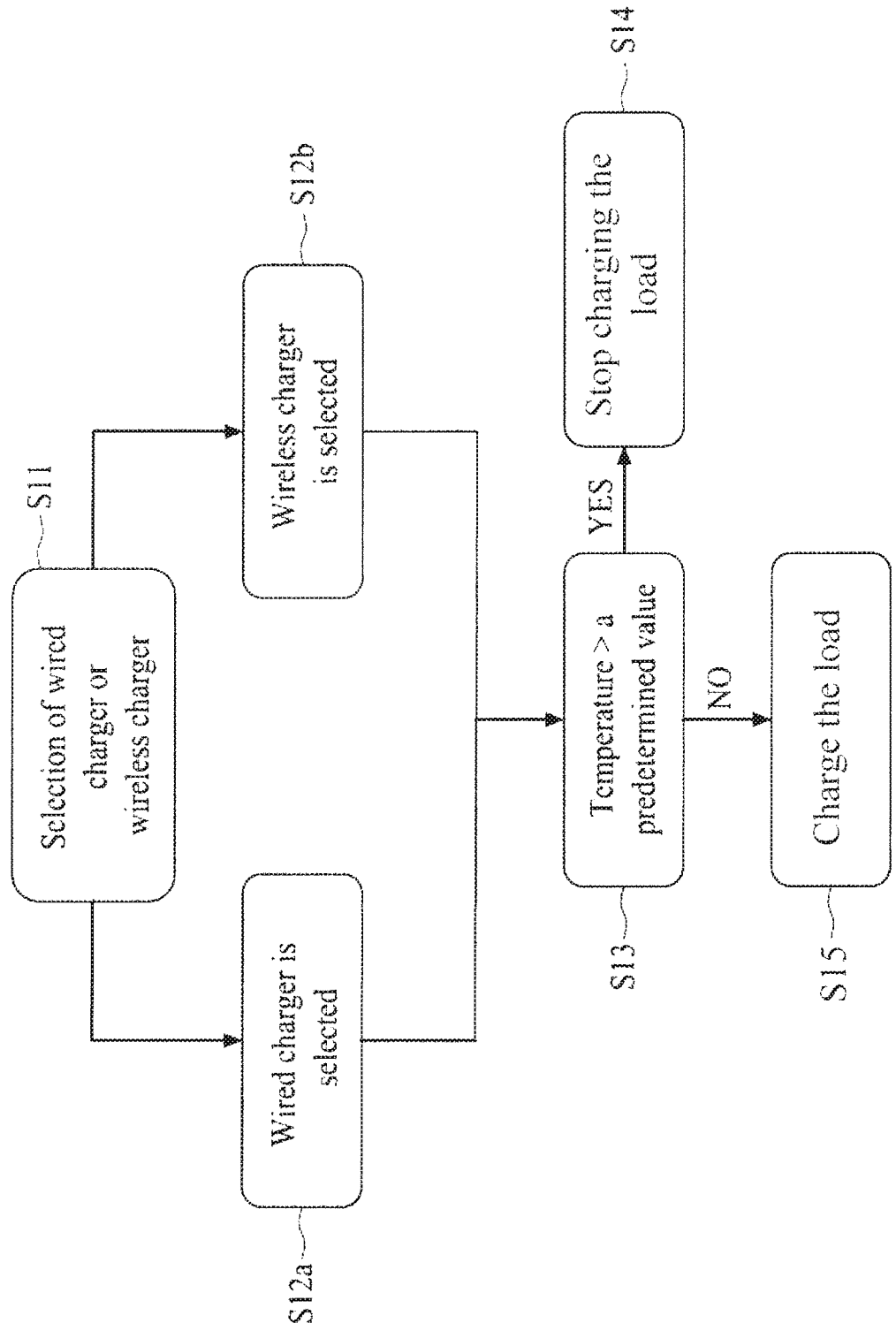
FIG. 2 illustrates a flow diagram of a method for power management in accordance with some embodiments of the present disclosure.

FIG. 2 illustrates a flow diagram showing a method for power management in accordance with some embodiments of the present disclosure. Referring to the operation S11, a system detects whether a wired charger or a wireless charger is activated. If both wired charger and wireless charger are activated or only the wired charger is activated, the wired charger is selected to provide an electric power to a load (during the operation S12a). If only the wireless charger is activated, the wireless charger is selected to provide an electric power to the load (during the operation S12b). In some embodiments, the selection may be performed by an MCU (e.g., MCU 130 as illustrated in FIG. 1A).

Referring to the operation S13, when the load is powered by the wired charger or the wireless charger, a temperature of the load is measured. In some embodiments, the temperature may be measured by a thermal sensitive resistor (e.g., R141 as illustrated in FIG. 1A).

Referring to the operation S14, if the temperature within the load is higher than a predetermined value (e.g., about 40 degrees, about 45 degrees, about 50 degrees, about 60 degrees, etc.), the MCU sends a disable signal to the wired charger or the wireless charger to stop the wired charger or the wireless charger from continuing providing electric power to the load (e.g., stopping charging the load). In some embodiments, the disable operation may be performed by pulling low the power supply circuit of the wired charger or the wireless charger.

Referring to the operation S15, if the temperature within the load is lower than or equal to the predetermined value, the MCU sends an enable signal to the wired charger or the wireless charger to provide (or continue providing) electric power to the load (e.g., charging the load). In some embodiments, the enable operation can be performed by pulling high the power supply circuit of the wired charger or the wireless charger.

Figure 3:
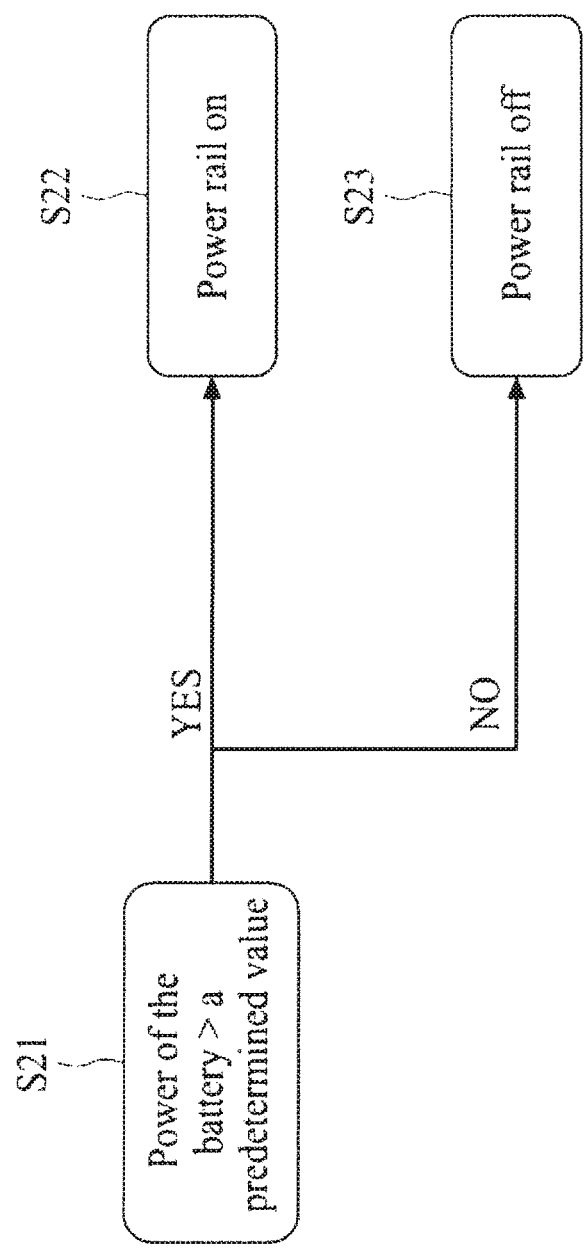
FIG. 3 illustrates a flow diagram of a method for power management in accordance with some embodiments of the present disclosure.

FIG. 3 illustrates a flow diagram showing a method for power management in accordance with some embodiments of the present disclosure. Referring to the operation S21, a remaining power level of a battery of an electronic device is detected. In some embodiments, the electronic device may be a mobile phone, a tablet, a computer, a vehicle remote controller or other electronic devices equipped with the battery. In some embodiments, the remaining power level of the battery may be detected by an MCU (e.g., MCU 130 as illustrated in FIG. 1A).

Referring to the operation S22, if the remaining power level of the battery is greater than a predetermined value (e.g., greater than about 40%, greater than about 30%, greater than about 20%, greater than about 10%, greater than about 5%, or greater than about 2%, etc.), the MCU sends a signal to a power management system (e.g., implemented as a power management integrated chip (PMIC)) to allow the battery to power the circuits (e.g., CPU) within the electronic device (also referred to as "power rail on").

Referring to the operation S23, if the remaining power level of the battery is less than or equal to the predetermined value, the MCU sends a signal to the PMIC to prevent the battery from powering the circuits (e.g., CPU) within the electronic device (also referred to as "power rail off").

In accordance with the embodiments shown in FIG. 3, using an MCU rather than a CPU to monitor the power of the battery may reduce the overall power consumption of the electronic device.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

Amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It can be clearly understood by those skilled in the art that various changes may be made, and equivalent elements may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. A power management system, comprising:
   a first power supply device;
   a second power supply device;
   a data processing device connected to the first power supply device and the second power supply device, the data processing device is configured to receive a first signal; and
   a load connected to the first power supply device and the second power supply device, the load comprising a thermal sensitive sensor connected with a first resistor in series, wherein the thermal sensitive sensor is configured to detect a temperature of the load and send a second signal to the data processing device based on the detected temperature,
   wherein the data processing device is configured to select the first power supply device or the second power supply device to provide power to the load according to the first signal; and
   wherein the data processing device is configured to enable or disable the first power supply device to provide power to the load according to the second signal.

2. The power management system of claim 1, further comprising a power supply control device connected to the first power supply device and the data processing device, the power supply control device is configured to provide the first signal to the data processing device when activated.

3. The power management system of claim 1, wherein the first power supply device is selected to provide power to the load when the first signal indicates that the first power supply device is activated or both of the first power supply device and the second power supply device are activated.

4. The power management system of claim 1, wherein the second power supply device is selected to provide power to the load when the first signal indicates that the second power supply device is activated and that the first power supply device is not activated.

5. The power management system of claim 1, wherein
   the first power supply device comprises a first power supply circuit configured to receive the second signal;
   the first power supply circuit is configured to be short-circuited to disable the first power supply device in response to determining that the detected temperature is higher than a threshold value; and
   the first power supply circuit is configured to be open-circuited to enable the first power supply device when the detected temperature is lower than or equal to the threshold value.

6. The power management system of claim 5, wherein
   the first power supply circuit comprises a transistor and a second resistor;
   a drain of the transistor is connected with one terminal of the second resistor;
   a source of the transistor is connected with another terminal of the second resistor; and
   a gate of the transistor is connected with the data processing device.

7. The power management system of claim 1, wherein the data processing device is configured to enable or disable the second power supply device to provide power to the load according to the second signal.

8. The power management system of claim 7, wherein
   the second power supply device comprises a second power supply circuit to receive the second signal;

the second power supply circuit is configured to be short-circuited to disable the second power supply device in response to determining that the detected temperature is higher than a threshold value; and the second power supply circuit is configured to be open-circuited to enable the second power supply device when the detected temperature is lower than or equal to the threshold value.

9. The power management system of claim 8, wherein the second power supply circuit comprises a transistor and a second resistor;

a drain of the transistor is connected with one terminal of the second resistor;

a source of the transistor is connected with another terminal of the second resistor; and a gate of the transistor is connected with the data processing device.

10. The power management system of claim 1, wherein the data processing device comprises an analog-to-digital converter (ADC) configured to receive the voltage across the thermal sensitive sensor and to convert the received voltage into a digital signal to control the first power supply device or the second power supply device.

11. The power management system of claim 1, wherein the data processing device is configured to disable the first power supply device to provide power to the load in response to determining that the temperature of the load is higher than a first predetermined value or lower than a second predetermined value.

12. The power management system of claim 1, wherein the data processing device is configured to disable the second power supply device to provide power to the load in response to determining that the temperature of the load is higher than a first predetermined value or lower than a second predetermined value.

13. The power management system of claim 1, wherein the data processing device is a microcontroller unit (MCU).

14. The power management system of claim 1, wherein the load is a battery and the data processing device is an MCU.

15. The power management system of claim 14, wherein
the battery comprises a power level detector configured to detect a remaining power level of the battery and send a third signal to the MCU based on the remaining power level of the battery;

the MCU is configured to enable the battery to provide power to an electronic device responsive to determining that the remaining power level of the battery is greater than a predetermined value; and the MCU is configured to disable the battery to provide power to the electronic device responsive to determining that the remaining power of the battery is less than or equal to the predetermined value.

* * * * *